(12) United States Patent
Nishiyama

(10) Patent No.: US 11,164,374 B2
(45) Date of Patent: Nov. 2, 2021

(54) MESH MODEL GENERATION METHOD, MESH MODEL GENERATION DEVICE, AND PROGRAM

(71) Applicant: Sony Interactive Entertainment Inc., Tokyo (JP)

(72) Inventor: Akira Nishiyama, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/878,068

(22) Filed: May 19, 2020

(65) Prior Publication Data

US 2020/0380776 A1 Dec. 3, 2020

(30) Foreign Application Priority Data

May 29, 2019 (JP) .............................. JP2019-100100

(51) Int. Cl.
*G06T 17/20* (2006.01)
*G06T 7/55* (2017.01)

(52) U.S. Cl.
CPC ................ *G06T 17/20* (2013.01); *G06T 7/55* (2017.01); *G06T 2210/56* (2013.01)

(58) Field of Classification Search
None
See application file for complete search history.

(56) References Cited

U.S. PATENT DOCUMENTS

| | | | |
|---|---|---|---|
| 2003/0046617 A1* | 3/2003 | MacPherson | G06T 17/20 714/48 |
| 2010/0074532 A1* | 3/2010 | Gordon | G06T 7/536 382/203 |
| 2017/0337732 A1* | 11/2017 | Tamersoy | G06K 9/6256 |
| 2019/0188895 A1* | 6/2019 | Miller, IV | G06K 9/00604 |
| 2020/0234455 A1* | 7/2020 | Lucas | G06T 7/251 |

FOREIGN PATENT DOCUMENTS

JP 2019-020952 A 2/2019

* cited by examiner

*Primary Examiner* — Frank S Chen
(74) *Attorney, Agent, or Firm* — Katten Muchin Rosenman LLP

(57) ABSTRACT

Disclosed herein is a mesh model generation method including generating time-series temporary mesh models representing an object with a changing shape from a plurality of pieces of point cloud data of the object acquired in a time-series manner, performing discretization analysis on the temporary mesh models, and generating a final mesh model by optimizing the temporary mesh models based on a time-series shape change of the object indicated by a result of the discretization analysis.

9 Claims, 5 Drawing Sheets

MESH MODEL GENERATION METHOD, MESH MODEL GENERATION DEVICE, AND PROGRAM

CROSS REFERENCE TO RELATED APPLICATIONS

This application claims the benefit of Japanese Priority Patent Application JP 2019-100100 filed May 29, 2019, the entire contents of which are incorporated herein by reference.

BACKGROUND

The present disclosure relates to a mesh model generation method, a mesh model generation device, and a program.

For example, it is common to generate a three-dimensional mesh model of an object for drawing in computer graphics. A technique for generating a three-dimensional mesh model is described in Japanese Patent Laid-open No. 2019-020952 (hereinafter referred to as Patent Document 1), for example. In the technique described in Patent Document 1, when generating a three-dimensional mesh model in which a surface of an object is represented by a mesh using a plurality of images of the object imaged from a plurality of different viewpoints, a weighting factor for each image is calculated according to a positional relation between each mesh and a camera or an illumination light source at the time of image capturing, and when generating a texture image corresponding to each mesh from the plurality of images, weighting is performed according to the weighting factor of each image. As a result, a texture image appropriate for the three-dimensional mesh model can be generated.

SUMMARY

Incidentally, a three-dimensional mesh model is explained as a model in which a surface of an object is represented by a triangular or quadrilateral mesh of a predetermined size as in the example described in Patent Document 1. If the mesh density is increased, minute shapes and variations of an object can be expressed, but the data size and amount of calculations increase. On the other hand, if the mesh density is reduced, the data size and amount of calculations can be reduced, but the expressiveness of the shape and variations of the object deteriorates. Techniques in related art, for example, in Patent Document 1, do not address the trade-off problem regarding the mesh density as described above.

The present disclosure has been made in view of the above circumstances, and it is desirable to provide a mesh model generation method, a mesh model generation device, and a program, capable of obtaining a three-dimensional mesh model in which an increase in data size and amount of calculations is suppressed by optimization processing corresponding to a movement of an object while maintaining a shape of the object.

According to an embodiment of the present disclosure, a mesh model generation method including generating time-series temporary mesh models representing an object with a changing shape from a plurality of pieces of point cloud data of the object acquired in a time-series manner, performing discretization analysis on the temporary mesh models, and generating a final mesh model by optimizing the temporary mesh models based on a time-series shape change of the object indicated by a result of the discretization analysis.

According to another embodiment of the present disclosure, a mesh model generation device including a temporary mesh model generation unit configured to generate time-series temporary mesh models representing an object with a changing shape from a plurality of pieces of point cloud data of the object acquired in a time-series manner, a discretization analysis unit configured to perform discretization analysis on the temporary mesh models, and a mesh model optimization unit configured to generate a final mesh model by optimizing the temporary mesh models based on a time-series shape change of the object indicated by a result of the discretization analysis.

According to yet another embodiment of the present disclosure, a program for causing a computer to function as a mesh model generation device including a temporary mesh model generation unit configured to generate time-series temporary mesh models representing an object with a changing shape from a plurality of pieces of point cloud data of the object acquired in a time-series manner, a discretization analysis unit configured to perform discretization analysis on the temporary mesh models, and a mesh model optimization unit configured to generate a final mesh model by optimizing the temporary mesh models based on a time-series shape change of the object indicated by a result of the discretization analysis.

According to the embodiments of the present disclosure, it is possible to obtain a three-dimensional mesh model in which an increase in data size and amount of calculations is suppressed by optimization processing corresponding to a movement of an object while maintaining a shape of the object.

DETAILED DESCRIPTION OF THE PREFERRED EMBODIMENTS

Hereinafter, some embodiments of the present disclosure will be described in detail with reference to the accompanying drawings. In the specification and the drawings of the present application, components having substantially the same function and configuration are denoted by the same reference symbols, and redundant descriptions are omitted.

Figure 1:
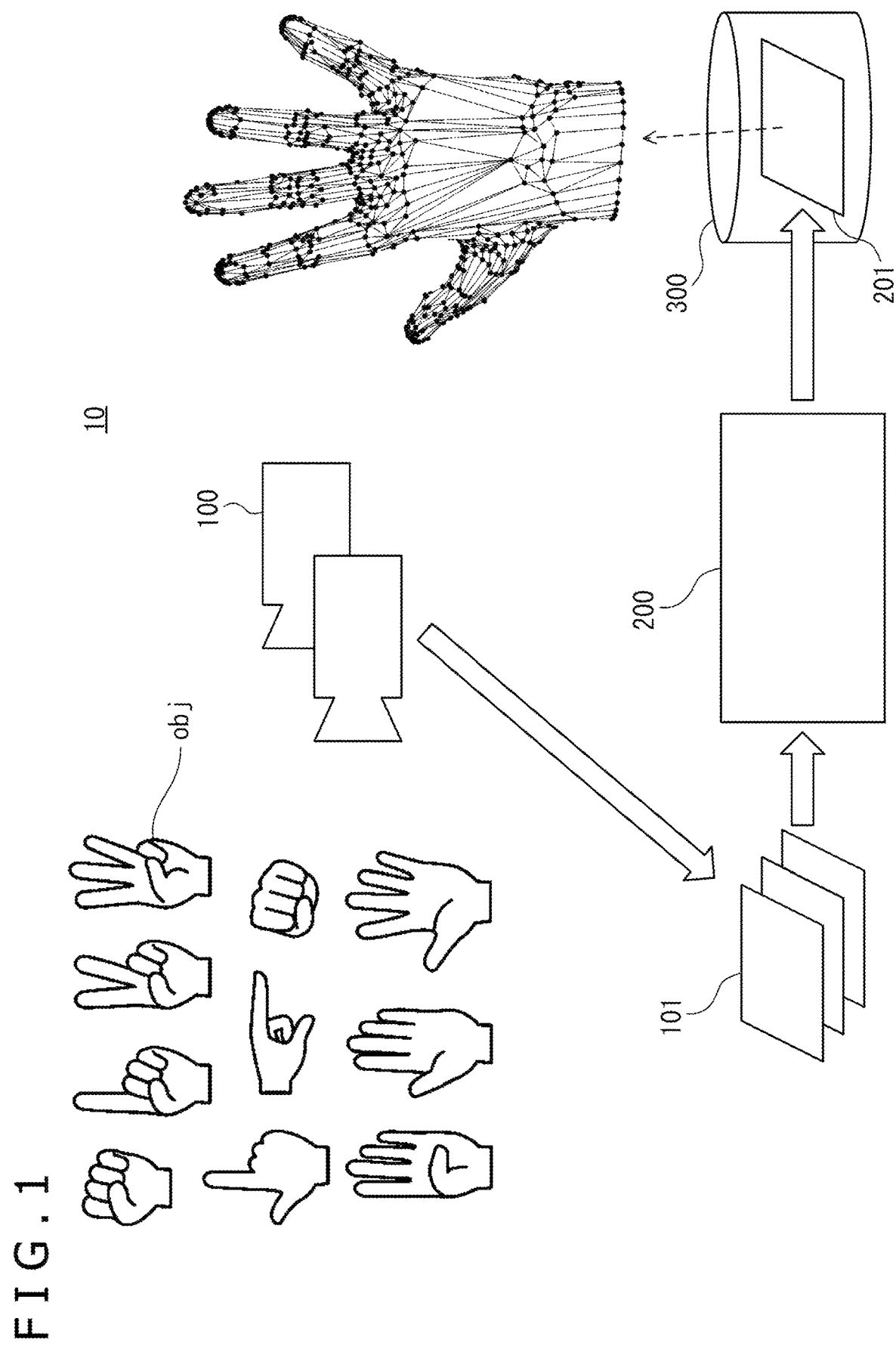
FIG. 1 is a diagram illustrating a schematic configuration of a system according to one embodiment of the present disclosure.

FIG. 1 is a diagram illustrating a schematic configuration of a system according to one embodiment of the present disclosure. In the illustrated example, a system 10 includes cameras 100 that acquire point cloud data 101 of an object obj, a mesh model generation device 200, and a storage device 300. The cameras 100 may be, for example, two or more depth cameras (RGB-D cameras) capable of acquiring a distance in a depth direction of the object obj. As the cameras 100, it is also possible to use two or more normal cameras (RGB cameras) in combination. Furthermore, as in an example described later, it is also possible to acquire the point cloud data 101 of the object obj by using a single camera 100. Here, the point cloud data 101 are data including at least three-dimensional coordinates of a space where the object obj exists, and are expressed as a set of points having three-dimensional coordinates indicated by the point cloud data 101 of the object obj.

In the present embodiment, a plurality of pieces of the point cloud data 101 are acquired in a time-series manner while changing a shape of the object obj. That is, as conceptually illustrated in FIG. 1, while the shape of the object obj (here, a human hand) changes due to various movements, the cameras 100, for example, repeatedly acquire the point cloud data 101 at predetermined time intervals, so that the plurality of pieces of point cloud data 101 of the object obj, with a changing shape, are acquired in a time-series manner. The acquired point cloud data 101 are input to the mesh model generation device 200. The mesh model generation device 200 generates a three-dimensional mesh model 201 from the point cloud data 101 according to a procedure described below, and stores the three-dimensional mesh model 201 in the storage device 300. The three-dimensional mesh model 201 can be used, for example, for drawing the object obj by computer graphics.

Figure 2:
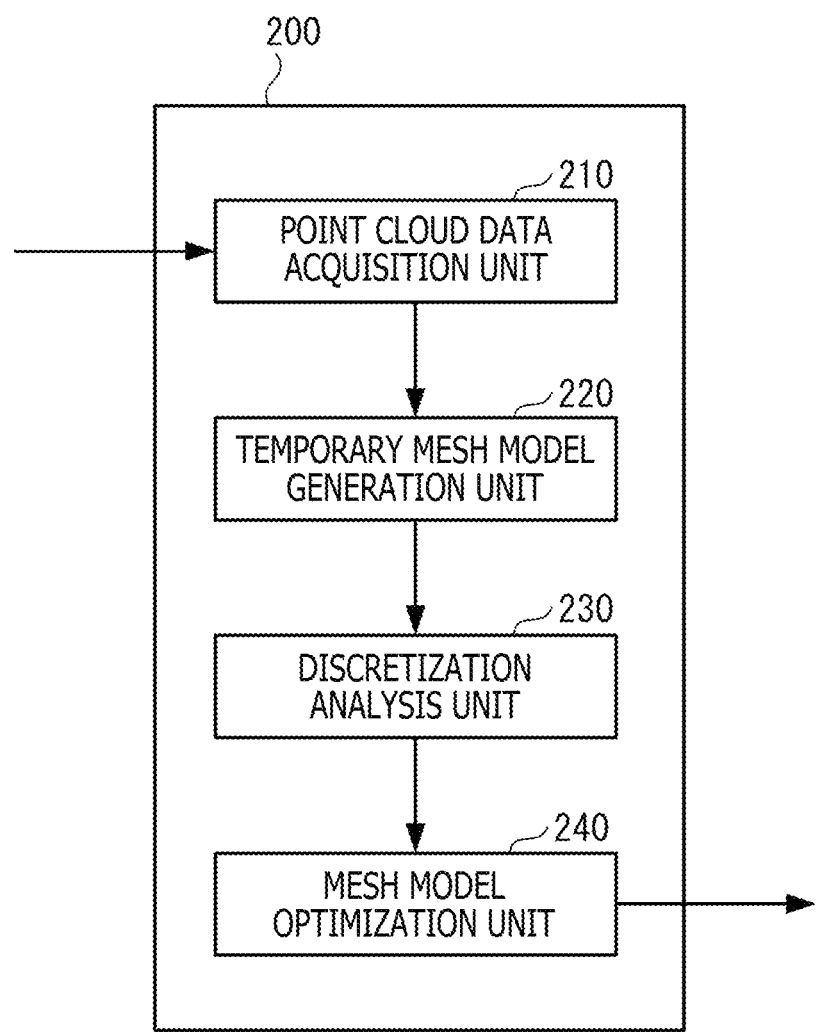
FIG. 2 is a block diagram illustrating a configuration example of a mesh model generation device in the system illustrated in FIG. 1.

FIG. 2 is a block diagram illustrating a configuration example of the mesh model generation device in the system illustrated in FIG. 1. In the illustrated example, the mesh model generation device 200 includes a point cloud data acquisition unit 210, a temporary mesh model generation unit 220, a discretization analysis unit 230, and a mesh model optimization unit 240. The mesh model generation device 200 is implemented by, for example, a computer having a communication interface, a processor, and a memory, and functions of the point cloud data acquisition unit 210, the temporary mesh model generation unit 220, the discretization analysis unit 230, and the mesh model optimization unit 240 are realized by the processor operating according to a program stored in the memory or received via the communication interface. Hereinafter, the functions of each unit will be further described.

The point cloud data acquisition unit 210 acquires a plurality of pieces of point cloud data $P_t$ (t=0, 1, ... , n) of the object obj with a changing shape, acquired in a time-series manner. As described for the point cloud data 101 illustrated in FIG. 1, the point cloud data $P_t$ include at least three-dimensional coordinates of points constituting a surface of the object obj at each time point.

The temporary mesh model generation unit 220 generates time-series temporary mesh models $M_t$ representing the object obj from the time-series point cloud data $P_t$ acquired by the point cloud data acquisition unit 210. In the temporary mesh models $M_t$, for example, meshes are arranged at a predetermined density for the entire object obj. In this specification, a mesh model is a three-dimensional mesh model unless otherwise specified. As a technique for generating a three-dimensional mesh model from a single piece of point cloud data, a publicly-known technique can be used, and thus a detailed description is omitted. The temporary mesh models $M_t$ may be generated based on, for example, a triangular patch, but this is not limitative.

The discretization analysis unit 230 performs discretization analysis on the time-series temporary mesh models $M_t$ generated by the temporary mesh model generation unit 220. Here, in the present specification, the discretization analysis is an analysis technique used in fluid analysis, for example, which expresses successive phenomena as an interaction between a plurality of elements that are temporally and spatially discrete. Specifically, it includes a finite difference method (FDM), a finite element method (FEM), a particle method, or the like, using a mesh or mesh nodes (also called control points) in the temporary mesh models $M_t$ as elements. The discretization analysis includes, for example, expressing a movement of the object obj between two temporary mesh models $M_t$ and $M_{t+1}$ that are continuous in a time-series manner by a mutual displacement of mesh nodes.

The mesh model optimization unit 240 generates a final mesh model $M_F$ by optimizing the temporary mesh models $M_t$ according to a result of the discretization analysis by the discretization analysis unit 230. The final mesh model $M_F$ is a three-dimensional mesh model 201 described with reference to FIG. 1. For example, the mesh model optimization unit 240 may make a mesh density of the mesh model $M_F$ higher than those of the temporary mesh models $M_t$ in a region where an amount of the mutual displacement of mesh nodes is large or a frequency of the mutual displacement is high in the discretization analysis of the temporary mesh models $M_t$ (t=0, 1, ... , n). Furthermore, the mesh model optimization unit 240 may make the mesh density of the mesh model $M_F$ lower than those of the temporary mesh models $M_t$ in a region where the amount of the mutual displacement of mesh nodes is small or the frequency of the mutual displacement is low in the discretization analysis.

More specifically, the mesh model optimization unit 240 may determine to increase or decrease the mesh density based on the displacement amount (distance or angle) of the mutual displacement occurred in a time series (t=0, 1, ... , n) in each region and the frequency of occurrence of the mutual displacement in which the displacement amount exceeds a threshold value. For example, by setting a relatively large threshold for the amount of displacement and a relatively small threshold (for example, once) for the occurrence frequency, the mesh density can be increased in a region where a large mutual displacement may occur although the occurrence frequency is low. Alternatively, by setting a relatively small threshold for the displacement amount (for example, a degree to which irregular noise can be removed) and setting a relatively large threshold for the occurrence frequency, the mesh density can be increased in a region where the frequency of the mutual displacement is high regardless of the displacement amount.

In the mesh model $M_F$ generated by the mesh model generation device 200 as described above, meshes are arranged at a higher density in a region where the shape change due to the movement of the object obj is relatively large. As a result, the movement of the object obj can be accurately represented. On the other hand, in the mesh model $M_F$, meshes are arranged at a lower density in a region where the shape change due to the movement of the object obj is relatively small. As a result, a data size of the mesh model $M_F$ can be reduced, and an increase in a calculation amount can be suppressed while enhancing the expressiveness of the movement of the object obj.

Figure 3:
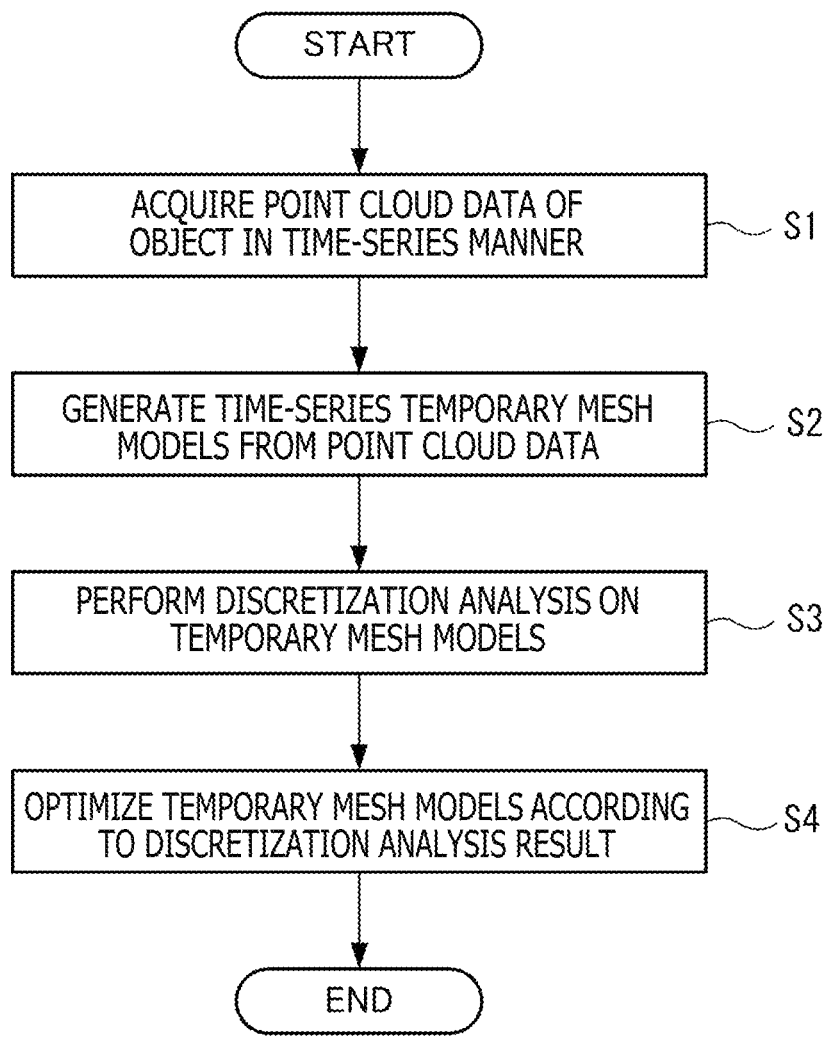
FIG. 3 is a flowchart illustrating a schematic process of a mesh model generation method according to one embodiment of the present disclosure.

FIG. 3 is a flowchart illustrating a schematic process of a mesh model generation method according to one embodiment of the present disclosure. First, as described above with reference to FIG. 1, the point cloud data 101 of the object obj are acquired in a time-series manner by using the cameras 100 (step S1). Next, as described with reference to FIG. 2, in the mesh model generation device 200, the temporary mesh model generation unit 220 generates the time-series temporary mesh models $M_t$ from the point cloud data $P_t$ acquired by the point cloud data acquisition unit 210 (step S2). Furthermore, the discretization analysis unit 230 performs discretization analysis on the temporary mesh models $M_t$ (step S3), and the mesh model optimization unit 240 optimizes the temporary mesh models $M_t$ according to the result of the discretization analysis to generate the final mesh model $M_F$ (step S4).

In the above processing flow, step S2 for generating the temporary mesh models $M_t$, step S3 for performing the discretization analysis, and step S4 for optimizing the temporary mesh models $M_t$ may be performed partially in parallel. More specifically, when the temporary mesh model generation unit 220 has generated some of the time-series temporary mesh models $M_t$ (t=0, 1, . . . m; m<n), the discretization analysis unit 230 may start the discretization analysis on the generated temporary mesh models $M_t$, and the generation of the remaining temporary mesh models $M_t$ (t=m+1, . . . , n) and the discretization analysis may be performed in parallel. Furthermore, the mesh model optimization unit 240 may generate an intermediate mesh model $M_M$ which is generated by optimizing the temporary mesh models $M_t$ in accordance with the result of the discretization analysis of the some of the time-series temporary mesh models $M_t$, and then the mesh model optimization unit 240 may generate the final mesh model $M_F$ by further optimizing the intermediate mesh model $M_M$ in accordance with the result of the discretization analysis of the remaining temporary mesh models $M_t$.

Figure 4:
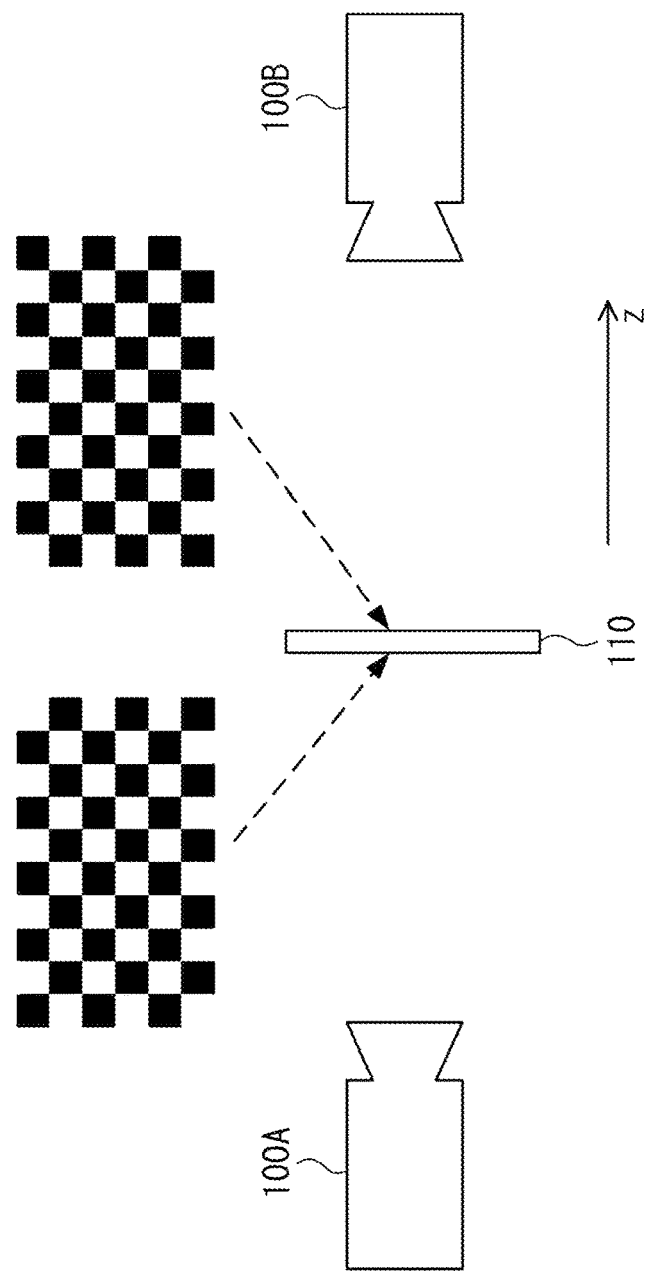
FIG. 4 is a diagram illustrating an example of a calibration method of a camera for acquiring point cloud data according to one embodiment of the present disclosure.

FIG. 4 is a diagram illustrating an example of a calibration method of a camera for acquiring point cloud data according to one embodiment of the present disclosure. As described above with reference to FIG. 1, in the present embodiment, the cameras 100 that acquire the point cloud data 101 of the object obj may be a combination of two or more cameras. In the example illustrated in FIG. 4, the point cloud data 101 are acquired by imaging the object obj with two cameras 100A and 100B facing each other across the object obj. In this case, before acquiring the point cloud data 101, a calibration procedure for causing three-dimensional coordinates to coincide between the images acquired by the cameras 100A and 100B is performed.

In the example mentioned above, the calibration procedure for the cameras 100A and 100B includes a step of causing three-dimensional coordinates to coincide between the images of a double-sided chart 110 arranged at an intermediate position between the cameras 100A and 100B, imaged by the cameras 100A and 100B. Here, the double-sided chart 110 is a reflection-type chart having an inverted pattern between a front surface and a back surface as illustrated, that is, the surfaces imaged by the respective cameras 100A and 100B. A thickness of the double-sided chart 110 is reduced, and the thickness in a z-axis direction (a depth direction of each of the cameras 100A and 100B) is regarded as 0, and by giving as a precondition that a coordinate position of the pattern is inverted in the images of the double-sided chart 110 imaged by the respective cameras 100A and 100B, the three-dimensional coordinates can easily coincide between the images.

Figure 5:
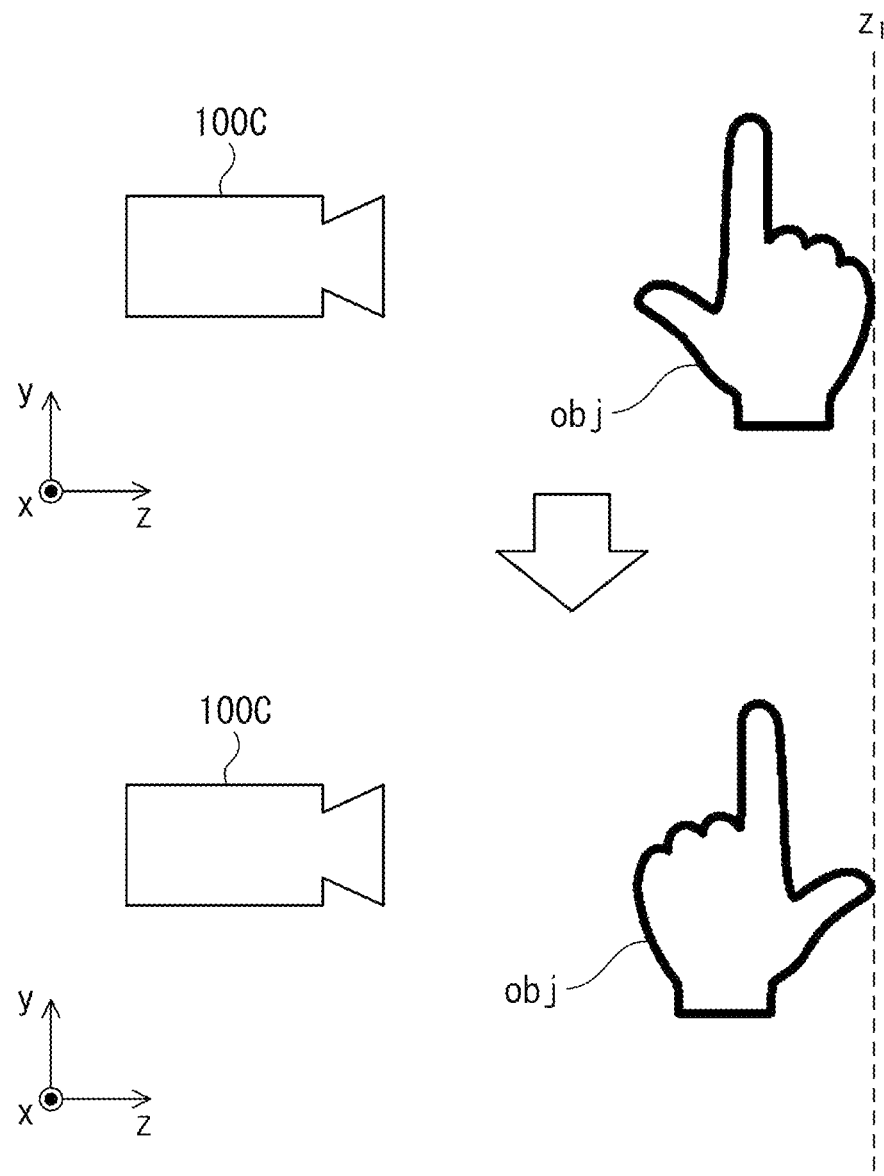
FIG. 5 is a diagram illustrating an example of a method for acquiring point cloud data of an object using a single camera in one embodiment of the present disclosure.

FIG. 5 is a diagram illustrating an example of a method for acquiring point cloud data of an object using a single camera in one embodiment of the present disclosure. In the illustrated example, at least two times of imaging are performed using a single depth camera 100C while the shape of the object obj is not changed. First, in the first imaging, when a depth direction of the depth camera 100C is set to a z-axis, after arranging the object obj such that an outline of the object obj is parallel to an x-y plane, the object obj is imaged to obtain a first depth image. At this time, a maximum coordinate (z coordinate) in the depth direction of the object obj is set to $z_1$. Next, in the second imaging, similarly, after arranging the object obj such that the outline of the object obj is parallel to the x-y plane, the object obj is rotated by 180 degrees around a y axis (an axis perpendicular to the z-axis; it may be an x-axis), and after translating the object obj such that the maximum coordinate (z coordinate) in the depth direction of the object obj is the same $z_1$ as the first imaging, the object obj is imaged to obtain a second depth image. Regarding the first and second depth images as described above, positions of the images in an x direction and a y direction are aligned such that the outlines of the object obj overlap as much as possible, and by inverting either one of the first and second depth images with respect to the z-coordinate and overlaying one on top of the other, the point cloud data 101 of the object obj can be acquired.

Furthermore, in the above example, although the object obj is translated in such a manner that the maximum coordinate in the depth direction is the same $z_1$ in the first imaging and the second imaging, it is not necessary to translate the object obj. For example, in the first imaging, the maximum coordinate in the depth direction (the thumb side in the illustrated example) may be set as $z_1$, and in the second imaging, a minimum coordinate in the depth direction (the little finger side in the illustrated example) may be set as $z_1$. In this case, if either one of the first and second depth images is rotated by 180 degrees around an axis of $z=z_1$, the images can be overlaid one on top of the other in the depth direction.

As described above, some embodiments of the present disclosure have been described in detail with reference to the accompanying drawings, but the present disclosure is not limited to such examples. It is obvious that a person ordinarily skilled in the art to which the present disclosure pertains could conceive of various changes or modifications within the scope of the technical idea described in the claims, and it is understood that these changes or modifications also rightfully fall within the technical scope of the present disclosure.

What is claimed is:

1. A mesh model generation method comprising:
generating time-series temporary mesh models representing an object with a changing shape from a plurality of pieces of point cloud data of the object acquired in a time-series manner;
performing discretization analysis on the temporary mesh models; and
generating a final mesh model from the temporary mesh models based on a time-series shape change of the object indicated by a result of the discretization analysis.

2. The mesh model generation method according to claim 1,
wherein the discretization analysis includes expressing a movement of the object between the temporary mesh models that are continuous in a time-series manner by a mutual displacement of mesh nodes.

3. The mesh model generation method according to claim 2,
wherein the generating the final mesh model includes making a mesh density of the final mesh model higher than those of the temporary mesh models in a region where an amount of the mutual displacement is large or a frequency of the mutual displacement is high.

4. The mesh model generation method according to claim 2,
wherein the generating the final mesh model includes making a mesh density of the final mesh model lower than those of the temporary mesh models in a region where an amount of the mutual displacement is small or a frequency of the mutual displacement is low.

5. The mesh model generation method according to claim 1,
wherein the discretization analysis is performed by a finite difference method, a finite element method, or a particle method, using a mesh or mesh nodes in the temporary mesh models as elements.

6. The mesh model generation method according to claim 1, further comprising:
acquiring the point cloud data by imaging the object with at least two cameras facing each other across the object; and
before the acquiring the point cloud data, by use of images of a double-sided chart arranged at an intermediate position between the at least two cameras captured by the at least two cameras, causing three-dimensional coordinates to coincide between the images captured by the at least two cameras,
wherein the double-sided chart has an inverted pattern between surfaces respectively imaged by the at least two cameras.

7. The mesh model generation method according to claim 1, further comprising:
obtaining a first depth image by imaging the object with a single camera while the shape of the object is not changed;
obtaining a second depth image by imaging the object with the single camera after rotating the object by 180 degrees around an axis perpendicular to a depth direction of the single camera and translating the object such that a maximum coordinate in the depth direction of the object coincides with that of the first depth image; and
acquiring the point cloud data by inverting either one of the first and second depth images with respect to the depth direction and overlaying one on top of the other.

8. A mesh model generation device comprising:
a temporary mesh model generation unit configured to generate time-series temporary mesh models representing an object with a changing shape from a plurality of pieces of point cloud data of the object acquired in a time-series manner;
a discretization analysis unit configured to perform discretization analysis on the temporary mesh models; and
a mesh model optimization unit configured to generate a final mesh model from the temporary mesh models based on a time-series shape change of the object indicated by a result of the discretization analysis.

9. A non-transitory computer readable medium having stored thereon a program for causing a computer to function as a mesh model generation device comprising:
a temporary mesh model generation unit configured to generate time-series temporary mesh models representing an object with a changing shape from a plurality of pieces of point cloud data of the object acquired in a time-series manner;
a discretization analysis unit configured to perform discretization analysis on the temporary mesh models; and
a mesh model optimization unit configured to generate a final mesh model from the temporary mesh models based on a time-series shape change of the object indicated by a result of the discretization analysis.

* * * * *